(12) United States Patent
Ogawa

(10) Patent No.: US 11,635,673 B2
(45) Date of Patent: Apr. 25, 2023

(54) LUMINESCENT MATERIAL PROTECTION MECHANISM, LIGHT SOURCE UNIT, AND PROJECTOR

(71) Applicant: CASIO COMPUTER CO., LTD., Tokyo (JP)

(72) Inventor: Masahiro Ogawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/160,921

(22) Filed: Jan. 28, 2021

(65) Prior Publication Data
US 2021/0240063 A1 Aug. 5, 2021

(30) Foreign Application Priority Data
Jan. 31, 2020 (JP) .............................. JP2020-014304

(51) Int. Cl.
G03B 21/20 (2006.01)
G03B 21/16 (2006.01)
F21V 29/70 (2015.01)
F21V 29/89 (2015.01)

(52) U.S. Cl.
CPC ........... *G03B 21/204* (2013.01); *G03B 21/16* (2013.01); *F21V 29/70* (2015.01); *F21V 29/89* (2015.01); *G03B 21/2013* (2013.01)

(58) Field of Classification Search
CPC ...... G03B 21/16; G03B 21/204; H01L 33/642
See application file for complete search history.

(56) References Cited

U.S. PATENT DOCUMENTS

| | | | |
|---|---|---|---|
| 9,377,622 B2 * | 6/2016 | Yamamoto | H04N 9/31 |
| 2009/0116214 A1 * | 5/2009 | Phillips, III | G02B 13/0055 362/84 |
| 2011/0001431 A1 * | 1/2011 | Brukilacchio | A61B 1/07 315/152 |
| 2012/0195054 A1 * | 8/2012 | Breidenassel | F21V 29/773 362/382 |
| 2013/0107535 A1 * | 5/2013 | Matsuwaki | H01L 33/642 362/260 |
| 2014/0176915 A1 * | 6/2014 | Yamamoto | G03B 21/204 353/31 |
| 2015/0159817 A1 * | 6/2015 | Olsson | F21K 9/90 362/294 |

(Continued)

FOREIGN PATENT DOCUMENTS

| | | |
|---|---|---|
| JP | 2007-080879 A | 3/2007 |
| JP | 2012-094611 A | 5/2012 |

(Continued)

OTHER PUBLICATIONS

JPO; Application No. 2020-014304; Notification of Reasons for Refusal dated Oct. 14, 2021.

*Primary Examiner* — Bao-Luan Q Le
(74) *Attorney, Agent, or Firm* — Fitch, Even, Tabin & Flannery LLP

(57) ABSTRACT

A luminescent light emitting device includes a base, a luminescent material layer provided on the base, a heat dissipating rib provided on an outer circumferential side of the luminescent material layer in such a manner as to rise erect from the base, and a collective lens fixed to the heat dissipating rib to seal in the luminescent material layer.

24 Claims, 5 Drawing Sheets

(56) References Cited

U.S. PATENT DOCUMENTS

| | | | | |
|---|---|---|---|---|
| 2016/0178186 A1* | 6/2016 | Kusunoki | ............... | F21V 29/87 |
| | | | | 362/373 |
| 2019/0158791 A1* | 5/2019 | Otani | ..................... | F21V 29/70 |
| 2020/0249554 A1* | 8/2020 | Kobayashi | ................ | F21V 7/26 |

FOREIGN PATENT DOCUMENTS

| | | | |
|---|---|---|---|
| JP | 2012-168507 | A | 9/2012 |
| JP | 2014-123014 | A | 7/2014 |
| JP | 2014-165058 | A | 9/2014 |
| JP | 2017-227862 | A | 12/2017 |
| JP | 2018-054876 | A | 4/2018 |
| JP | 2019-510260 | A | 4/2019 |
| JP | 2019-095771 | A | 6/2019 |

* cited by examiner

LUMINESCENT MATERIAL PROTECTION MECHANISM, LIGHT SOURCE UNIT, AND PROJECTOR

CROSS-REFERENCE TO RELATED APPLICATION

This patent application is based upon and claims the benefit of priority under 35 USC 119 from Japanese Patent Application No. 2020-014304 filed on Jan. 31, 2020, the entire disclosure of which, including the specification, claims, drawings, and abstract thereof, is incorporated herein by reference in its entirety.

BACKGROUND OF THE INVENTION

Field of the Invention

The present invention relates to a luminescent light emitting device, a light source unit, and a projector including the light source unit.

Description of the Related Art

There have conventionally been proposed projectors for projecting an image formed by use of a micromirror display device called a digital micromirror device (DMD) or a liquid crystal panel onto a screen. For example, Japanese Patent Laid-Open No. 2017-227862 (JP-A-2017-227862) discloses a projector including multiple laser diodes for emitting light having a wavelength in the red wavelength range or simply light in the red wavelength range and light having a wavelength in the blue wavelength range or simply light in the blue wavelength range and a luminescent plate configured to be excited by light in the blue wavelength range emitted by a part of the laser diodes to emit light having a wavelength in the green wavelength range or simply light in the green wavelength range. Light in the red wavelength range, light in the blue wavelength range, and light in the green wavelength range which are emitted from the laser diodes and the luminescent plate are shone onto a display device, whereby image light is formed. The image light is reflected by the display device and is then projected onto a screen by way of a projection-side optical system.

SUMMARY OF THE INVENTION

According to one aspect of the present invention, there is provided a luminescent light emitting device including a base, a luminescent material layer provided on the base, a heat dissipating rib provided on an outer circumferential side of the luminescent material layer in such a manner as to rise erect from the base, and a collective lens fixed to the heat dissipating rib to seal in the luminescent material layer.

DETAILED DESCRIPTION OF THE PREFERRED EMBODIMENT

Figure 1:
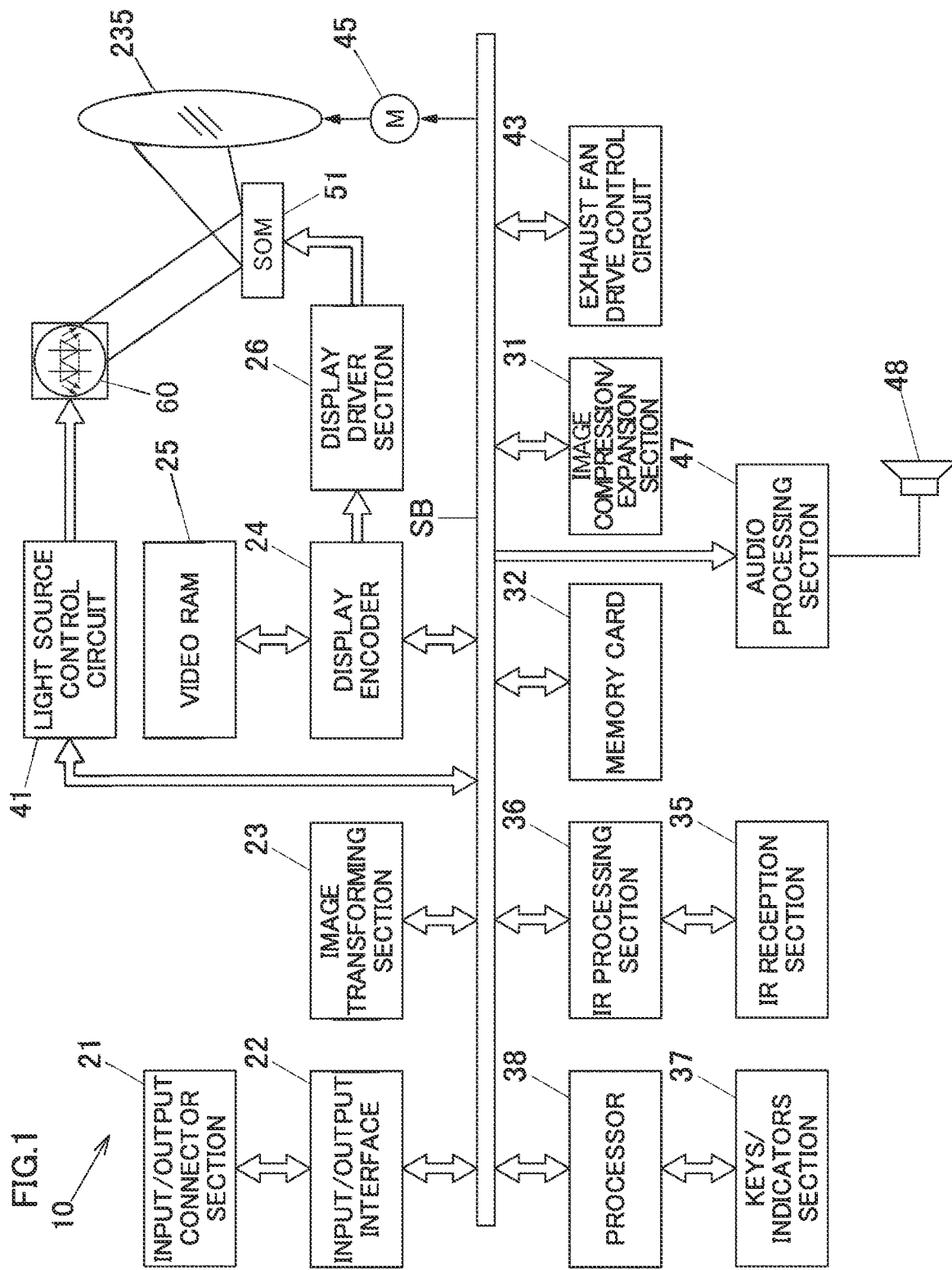
FIG. 1 is a diagram showing functional circuitry blocks of a projector according to an embodiment of the present invention.

Hereinafter, an embodiment of the present invention will be described. FIG. 1 is a block diagram showing functional circuitry blocks of a projector 10. A projector control unit is configured of a CPU including an image transforming section 23 and a processor 38, a front-end unit including an input/output interface 22, and a formatter unit including a display encoder 24 and a display drive section 26. Image signals of various standards which are inputted from the input/output connector section 21 are sent to the image transforming section 23 via the input/output interface 22 and a system bus SB, and the image signals so sent are transformed to be unified into an image signal of a predetermined format which is suitable for display in the image transforming section 23. Thereafter, the unified image signal is outputted to the display encoder 24.

The display encoder 24 deploys the image signal inputted thereinto on a video RAM 25 for storage therein and generates a video signal from the contents of the video RAM 25 stored therein, outputting the video signal so generated to the display drive section 26.

The display drive section 26 drives a display device 50, which is a spatial optical modulator (SOM), at an appropriate frame rate in response to the image signal outputted from the display encoder 24. Then, in the projector 10, a pencil of light emitted from a light source unit 60 is shined onto the display device 50 via a light guiding optical system, whereby an optical image is formed by reflected light reflected by the display device 50, and the image so formed is then projected onto a projection target body such as a screen, not shown, via a projection optical system 220 (refer to FIG. 2) for display on the screen. A movable lens group 235 of the projection optical system 220 can be driven by a lens motor 45 for zooming and focusing.

An image compression/expansion section 31 performs a recording process in which a luminance signal and a color difference signal of the image signal are data compressed through processing such as Adaptive Discrete Cosine Transform (ADCT), Huffman effect and the like, and the compressed data is sequentially written on a memory card 32, which is a detachable recording medium. Further, with the projector 10 set in a reproducing mode, the image compression/expansion section 31 reads out the image data recorded in the memory card 32 and expands the individual image data that makes up a series of dynamic images frame by frame, outputting the image data to the display encoder 24 byway of the image transforming section 23. As a result, the image compression/expansion section 31 can output dynamic images or the like based on the image data stored in the memory card 32.

The processor 38 governs the control of operations of individual circuitries inside the projector 10 and is configured of CPU, ROM that stores fixedly operation programs such as various settings or the like, RAM that is used as a work memory, and the like.

A keys/indicators section 37 is configured of main keys, indicators, and the like which are provided on a casing of the projector 10. Operation signals of the keys/indicators section 37 are sent out directly to the processor 38. Key operation signals from a remote controller are received by an IR reception section 35 and are then demodulated into a code signal at an Ir processing section 36 for output to the processor 38.

The processor 38 is connected with an audio processing section 47 byway of the system bus (SB). This audio processing section 47 includes a circuitry for a sound source such as a PCM sound source. With the projector 10 set in a projection mode and the reproducing mode, the audio processing section 47 converts audio data into analog signals and drives a speaker 48 to output loudly sound or voice based on the audio data.

Additionally, the processor 38 controls a light source control circuit 41. The light source control circuit 41 controls separately the operation of an excitation light shining device of the light source unit 60 in such a manner that lights in predetermined wavelength ranges which are required in generating an image are emitted from the light source unit 60.

In addition, the processor 38 causes an exhaust fan drive control circuit 43 to detect temperatures using multiple temperature sensors which are provided in the light source unit 60 or the like so as to control revolution speeds of exhaust fans based on the results of the temperature detections so performed. Further, the processor 38 also causes the exhaust fan drive control circuit 43 to keep the exhaust fans revolving by use of a timer or the like even after a power supply to a main body of the projector 10 is switched off. Alternatively, the processor 38 causes the exhaust fan drive control circuit 43 to switch off the power supply to the main body of the projector 10 depending upon the results of the temperature detections by the temperature sensors.

Figure 2:
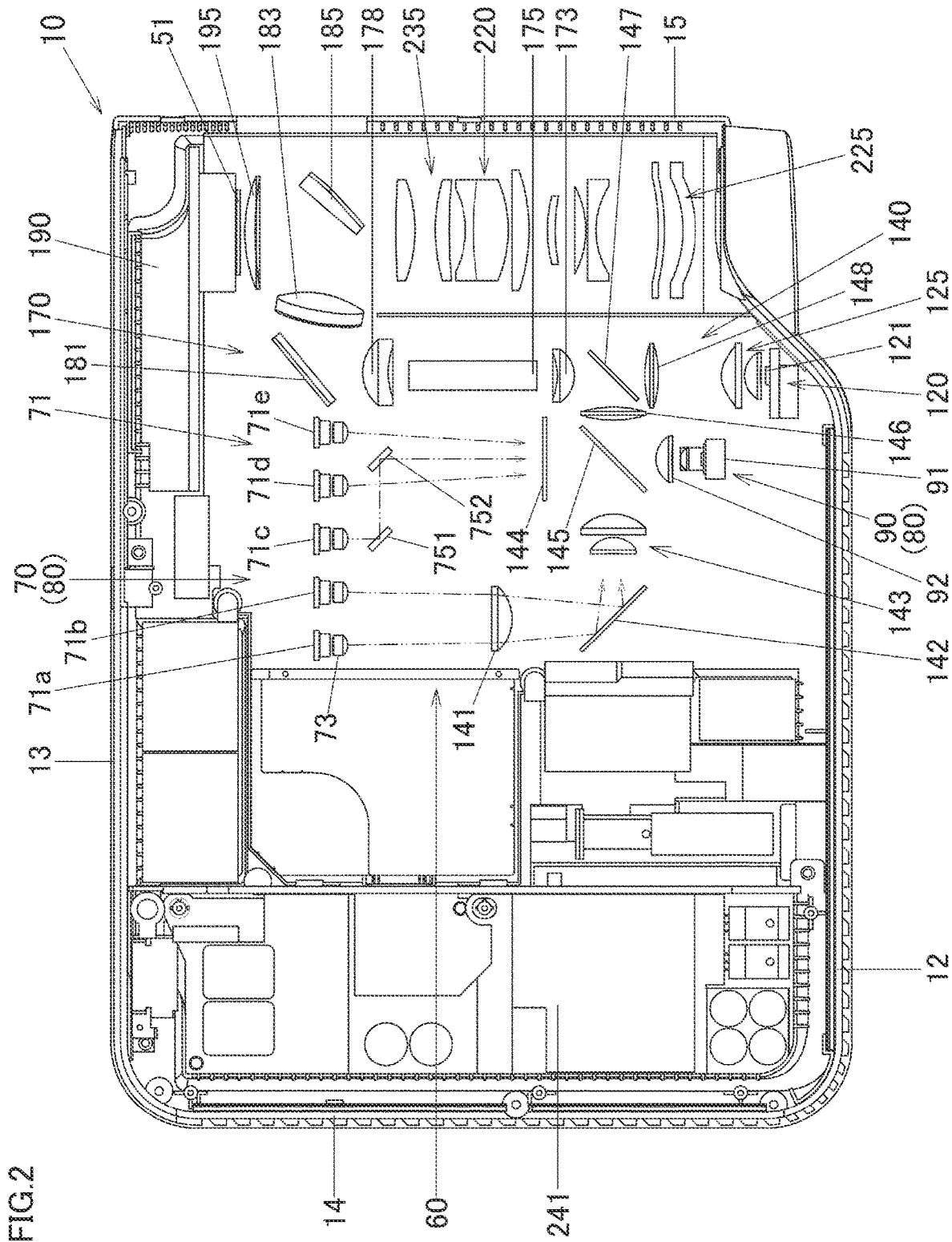
FIG. 2 is a schematic plan view showing an internal structure of the projector according to the embodiment of the present invention.

FIG. 2 is a schematic plan view showing an internal structure of the projector 10. The projector 10 includes the light source unit 60, a light source-side optical system 170, the projection optical system 220, and the like. Additionally, the projector 10 drives a drive section (which includes an excitation light shining device 70, a red light source device 120, a luminescent light emitting device 90, and the like) inside the light source unit 60, the drive section being connected with a circuit board including internal power circuit blocks, light source control blocks, and the like.

The light source unit 60 includes an excitation light shining device 70, which constitutes not only a light source of light having a wavelength in the blue wavelength range or simply, light in the blue wavelength range but also a light source of excitation light, a green light source device 80, which constitutes a light source of light having a wavelength in the green wavelength range or simply, light in the green wavelength range, and a red light source device 120, which constitutes a light source of light having a wavelength in the red wavelength range or simply, light in the red wavelength range. The green light source device 80 is configured of the excitation light shining device 70 and a luminescent light emitting device 90.

A light guiding optical system 140, which is configured to guide lights in the blue, green and red wavelength ranges, and the light source-side optical system 170 are disposed in the light source unit 60. The light guiding optical system. 140 guides lights emitted from the excitation light shining device 70, the green light source device 80, and the red light source device 120 to the light source-side optical system 170.

The excitation light shining device 70 is disposed at the back of the projector 10 near a back panel 13. The excitation light shining device 70 includes a group of light sources made up of multiple blue laser diodes 71. The blue laser diodes 71 are disposed in such a manner that axes of lights emitted therefrom become substantially parallel to an axis of light emitted from a red light emitting diode 121 of the red light source device 120. This group of light sources is made up by disposing the multiple blue laser diodes 71 into a matrix configuration. In the present embodiment, when the group of light sources or multiple blue laser diodes 71 is seen from a front panel 12 side of the projector 10 shown in FIG. 2, the blue laser diodes 71 are arranged into a matrix configuration of two rows and five columns (the arrangement of the blue laser diodes 71 in the matrix configuration is not shown). In the schematic plan view of FIG. 2, five blue laser diodes 71a to 71e are shown as being aligned in a column direction. Collimator lenses 73 are disposed individually on respective optical axes of the blue laser diodes 71a to 71e to convert lights emitted from the blue laser diodes 71a to 71e into parallel lights so as to enhance the directivity thereof.

Apart of the multiple blue laser diodes 71a to 71e, that is, the blue laser diodes 71a, 71b thereof are used as light sources for emitting light in the blue wavelength range. A collective lens 141 of the light guiding optical system 140 is disposed substantially in front of the blue laser diodes 71a, 71b. Lights in the blue wavelength range emitted from the blue laser diodes 71a, 71b are incident on the collective lens 141 so as to be collected.

In addition, the other part of the multiple blue laser diodes 71a to 71e, that is, the blue laser diodes 71c to 71e thereof are used as a light source of the luminescent light emitting device 90. A diffuse plate 144 of the light guiding optical system 140 is disposed substantially in front of the blue laser diodes 71d, 71e, so that excitation lights emitted individually from the blue laser diodes 71d, 71e are incident directly on the diffuse plate 144. An axis of excitation light emitted from the blue laser diode 71c, which is disposed to a side of the blue laser diodes 71d, 71e (in a position between the blue laser diode 71b and the blue laser diode 71d in FIG. 2), is reflected by reflection mirrors 751, 752 subsequently, is then guided to be positioned between respective excitation lights emitted from the blue laser diodes 71d, 71e, and is thereafter incident on the diffuse plate 144. In the present embodiment, the excitation lights emitted individually from the blue laser diodes 71c to 71e are light in the blue wavelength range whose wavelength range is the same as the wavelength range of the lights emitted individually from the blue laser diodes 71a, 71b.

The luminescent light emitting device 90, which makes up the green light source device 80, is disposed on optical paths of excitation lights emitted from the blue laser diodes 71c to 71e of the excitation light shining device 70 and in the vicinity of the front panel 12. The luminescent light emitting device 90 includes a luminescent light emitting element 91 and a collective lens 92 (a second collective lens). When excitation light is shone onto the luminescent light emitting element 91, the luminescent light emitting element 91 emits light in the green wavelength range as luminescent light. The collective lens 92 collects excitation lights emitted from the blue laser diodes 71c to 71e and also collects light in the green wavelength range emitted from the luminescent light emitting device 91 in the direction of the back panel 13.

Figure 3A:
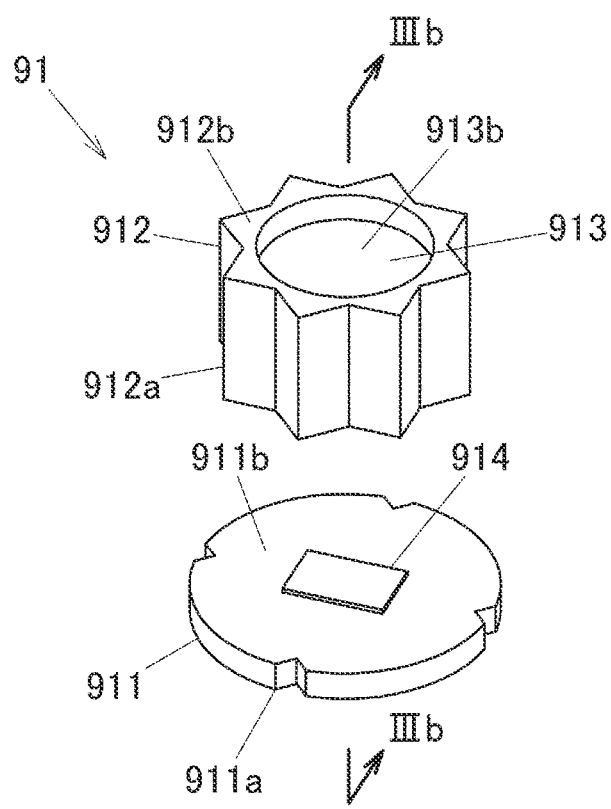
FIG. 3A is an exploded perspective view of a luminescent light emitting device according to the embodiment of the invention.

Here, a specific configuration of the luminescent light emitting device 91 will be described. FIG. 3A is an exploded perspective view of the luminescent light emitting device 91. In addition, FIG. 3B is a sectional view of the luminescent light emitting device 91, in which component parts are now assembled together, corresponding to a section taken along a line IIIb-IIIb of the luminescent light emitting device 91 shown in FIG. 3A.

The luminescent light emitting device 91 includes a base 911 having a substantially disk-like shape, a cylindrical housing 911 having a substantially circular cylindrical shape, and a collective lens 913 (a first collective lens), which is fixed in place inside the cylindrical casing 912. The base 911 is formed of metal such as aluminum, copper or the like. A plurality of notches 911a having a substantially V-shape in a plan view are provided on an outer circumferential edge of the base 911.

A luminescent material layer 914, which has a rectangular flat plate-like shape, is provided on the base 911. A surface 911b of the base 911 is mirror finished through silver vacuum deposition or the like to thereby form a flat reflection section, and the luminescent material layer 914 is fixed onto the reflection section of the surface 911b by means of a joining material such as solder. The luminescent material layer 914 is formed of a binder, for example, of a silicone resin having heat-resisting properties and light-transmitting properties and a green luminescent material which is dispersed uniformly in the binder. Alternatively, it is possible to use a luminescent material layer in which luminescent material particles are dispersed in an inorganic binder, for example, of alumina or a luminescent material layer in which luminescent material particles are sintered without using any binder. The green luminescent material emits light in the green wavelength range as luminescent light when the green luminescent material is excited by excitation light shone onto the luminescent material layer 914.

Figure 3B:
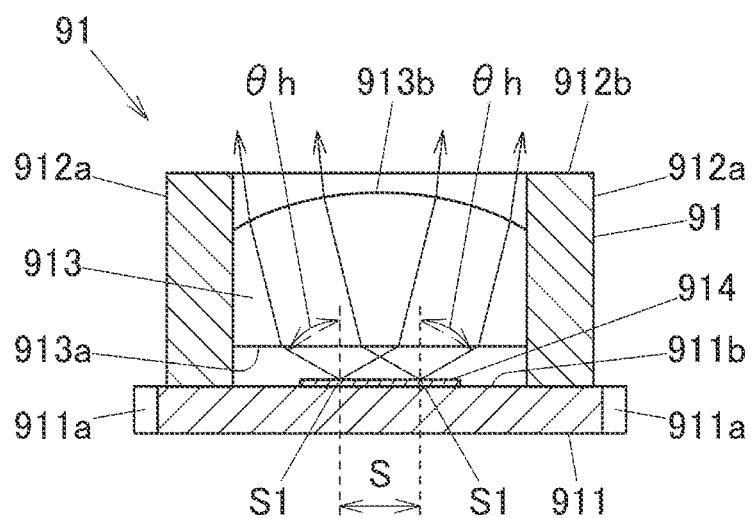
FIG. 3B is a sectional view of the luminescent light emitting device, in which its component parts are now assembled together, corresponding to a section taken along a line IIIb-IIIb of the luminescent light emitting device shown in FIG. 3A.

The cylindrical housing 912 is provided on the base 911 in such a manner that the cylindrical housing 912 rises erect from the surface 911b of the base 911 at an outer circumferential portion of the luminescent material layer 914 (refer to FIG. 3B). The cylindrical housing 912 is formed of metal such as iron or the like. When the luminescent light emitting element 91 is seen from above, the luminescent material layer 914 is disposed substantially at a center of an inside of the cylindrical casing 912. That is, the luminescent material layer 914 is positioned on a center axis of the cylindrical casing 912. In addition, the cylindrical casing 912 has multiple heat dissipating ribs 912a on an outer circumferential surface thereof. The heat dissipating ribs 912a extend along an axial direction of the cylindrical casing 912 (that is, an axial direction of excitation light and luminescent light) and are provided at multiple locations on the outer circumferential surface of the cylindrical casing 912 in a circumferential direction. Each heat dissipating rib 912a has a substantially isosceles triangle-like shape in cross section, and the heat dissipating ribs 912a are disposed adjacent to each other in the circumferential direction in such a manner that inclined side surfaces thereof are connected continuously. The cylindrical casing 912 and the base 911 are connected together by means of a heat transfer joining material such as solder or the like. An inner circumferential surface of the cylindrical casing 912 is mirror finished. As a result, in light in the green wavelength range emitted from the luminescent material layer 914, light shone onto the inner circumferential surface of the cylindrical casing 912 is prevented from being absorbed into the cylindrical casing 912 and is then reflected towards the collective lens 92 shown in FIG. 2, whereby the luminance efficiency of the luminescent light emitting device 90 can be improved.

As shown in FIG. 3B, the collective lens 913 is positioned on an optical path of light in the green wavelength range emitted from the luminescent material layer 914. The collective lens 913 is a planoconvex lens in which a luminescent light incident surface 913 is formed flat, whereas an opposite light emerging surface 913b is formed into a convex arc-like shape. The collective lens 913 is fixed in place at a portion of the cylindrical casing 912 which lies near to a distal end portion 912b thereof through crimping. The collective lens 913 is disposed in such a manner as to encompass and seal in the luminescent material layer 914 inside the cylindrical casing 912.

When in a front position situated apart from the collective lens 913 and the cylindrical casing 912, the collective lens 92 shown in FIG. 2 is disposed in such a manner that an optical axis thereof is aligned with an optical axis of the collective lens 913. The collective lens 92 has a greater lens diameter than that of the collective lens 913, so that the collective lens 92 can collect light from a wider range.

Next, operations of the luminescent light emitting device 90 will be described. Excitation lights emitted from the blue laser diodes 71c to 71e in FIG. 2 are incident on the collective lens 913 of the luminescent light emitting element 91. The excitation lights are collected by the collective lens 913 and are then shone onto a shining area S of the luminescent material layer 914 shown in FIG. 3B. A cross section of a pencil of excitation light emitted from the blue laser diodes 71c to 71e has a substantially elliptic shape. As a result, as shown in the schematic plan view of the luminescent material layer 914 in FIG. 4, the shining area S is also formed into a substantially elliptic shape. An external shape of the luminescent material layer 914 is formed wider than widths of the shining area S. In the luminescent material layer 914 of the present embodiment, a width l1 in a major axis direction of the shining area S and a non-shining width W12 of the luminescent material layer 914 in this major axis direction are formed into a ratio of about 2:1. In addition, a width W21 in a minor axis direction of the shining area S and a non-shining width W22 of the luminescent material layer 914 in this minor axis direction are formed into a ratio of about 1.5:1.

Figure 5:
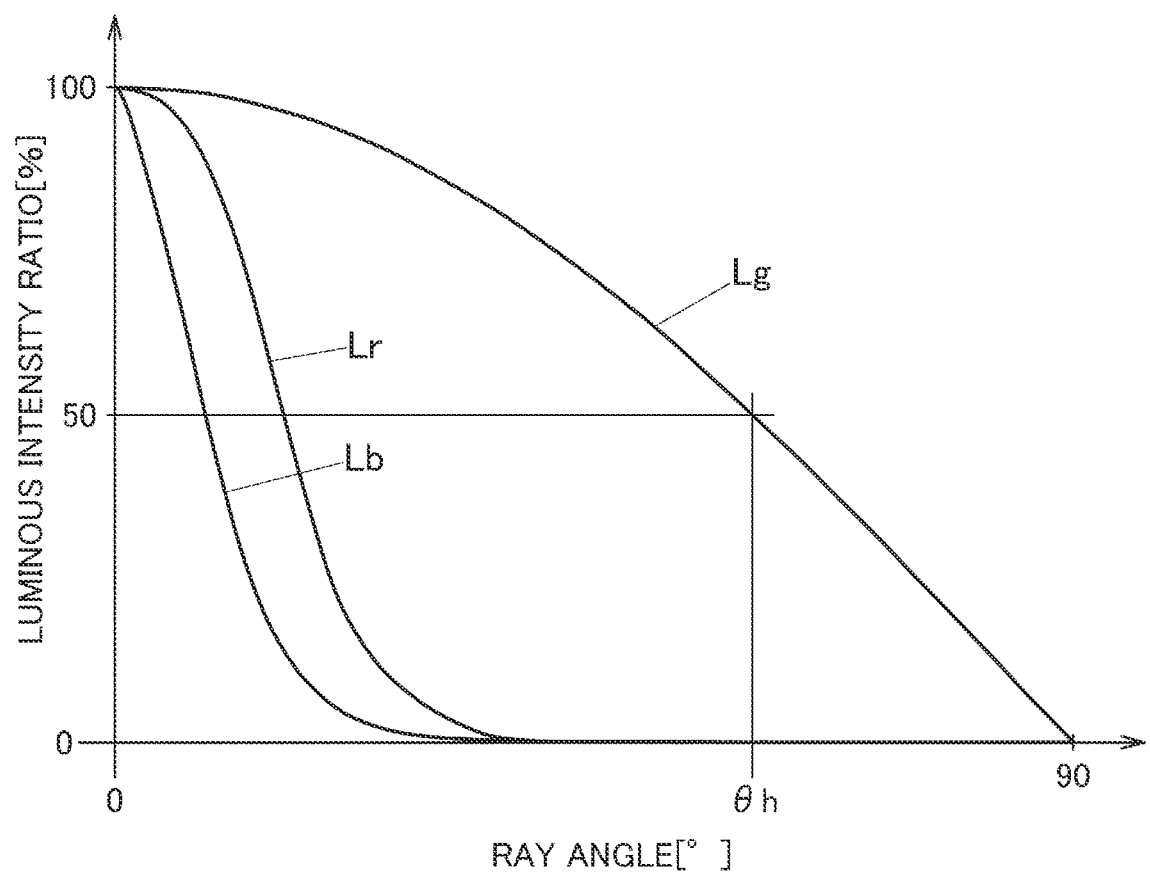
FIG. 5 is a chart showing a relationship between luminous intensity ratios and ray angles of light in the blue wavelength range, light in the red wavelength range, and light in the green wavelength range which are emitted by a blue laser diode, a red light emitting diode, and the luminescent body, respectively, according to the embodiment of the present invention.

The luminescent material layer 914 is excited by excitation light shone onto the shining area S to emit light in the green wavelength range. A diffuse angle of light in the green wavelength range will be described by reference to FIG. 5. FIG. 5 is a chart showing ray angles of light in the blue wavelength range Lb emitted from the blue laser diodes 71, light in the red wavelength range Lr emitted from the red light emitting diode 121, and light in the green wavelength range Lg emitted from the luminescent material layer 914. Light in the blue wavelength range Lb has a narrowest ray angle compared with those of light in the red wavelength range Lr and light in the green wavelength range Lg and, as a result, has a highest directivity. On the other hand, light in the green wavelength range Lg has a widest ray angle compared with those of light in the blue wavelength range Lb and light in the red wavelength range Lr and, as a result, has a lowest directivity (that is, a highest diffusion). In the present embodiment, a half-power angle θh of light in the green wavelength range Lg emitted from the luminescent material layer 914 is about 60°.

Figure 4:
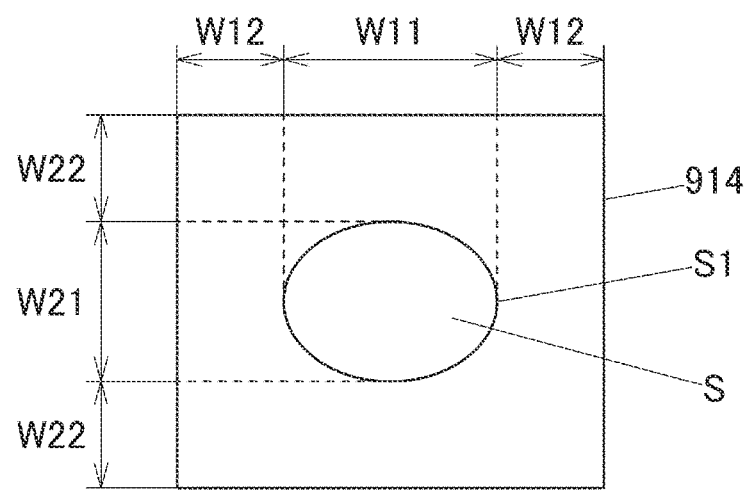
FIG. 4 is a schematic plan view of a luminescent body according to the embodiment of the present invention.

Returning to FIG. 3B, a part of light in the green wavelength range emitted from the luminescent material layer 914 is emitted towards the collective lens 913, while the other part of the light in the green wavelength range so emitted is emitted towards the base 911. The light in the green wavelength range emitted towards the base 911 is reflected towards the collective lens 913 by the reflection section formed on the surface 911b. The collective lens 913 is disposed so that light in the green wavelength range emitted from the luminescent material layer 914 and falling within the half-power angle θh thereof passes through the incident surface 913a and the emerging surface 913b to be collected directly without being shone onto the inner circumferential surface of the cylindrical casing 912. As a result, the collective lens 913 is disposed close enough to the luminescent material layer 914. For example, in the case that the half-power angle θh shown in FIG. 4 is 60°, the collective lens 913 causes at least light in the green wavelength range diffusing outwards of the shining area S at 60° from a circumferential edge S1 of the shining area S to pass through the incident surface 913a and the emerging surface 913b. As a result, the collective lens 913 can take in to collect almost all light in the green wavelength range emitted from the luminescent material layer 914 and guide it towards the collective lens 92. Light in the green wavelength range which is not incident directly on the incident surface 913a is reflected on the surface 911b of the base 911 and the inner circumferential surface of the cylindrical casing 912 and is also caused to be incident on the collective lens 913.

Returning to FIG. 2, the red light source device 120 includes the red light emitting diode 121 and a collective lens group 125 for collecting light in the red wavelength range emitted from the red light emitting diode 121. The red light source device 120 is disposed so that light in the red wavelength range emitted from the red light emitting diode 121 travels substantially straight to be incident directly on a collective lens 173 of the light source-side optical system 170.

The light guiding optical system 140 includes the collective lens 141, a reflection mirror 142, a collective lens group 143, the diffuse plate 144, a first dichroic mirror 145, a collective lens 146, a second dichroic mirror 147, and a collective lens 148.

The collective lens 141 collects light in the blue wavelength range emitted from the blue laser diodes 71a, 71b and guides it to the reflection mirror 142. The reflection mirror 142 reflects the light in the blue wavelength range collected by the collective lens 141 towards the collective lens group 143. The reflection mirror 142 may be configured so as to reflect light in the blue wavelength range while diffusing it by forming minute irregularities on its reflection surface through sand blasting or the like. The collective lens group 143 collects the light in the blue wavelength range reflected by the reflection mirror 142 and guides it to the first dichroic mirror 145.

The first dichroic mirror 145 transmits light in the blue wavelength range and reflects light in the green wavelength range. Consequently, the first dichroic mirror 145 transmits the light in the blue wavelength range collected by the collective lens group 143 and guides it towards the collective lens 146. In addition, the first dichroic mirror 145 transmits the light in the blue wavelength range emitted while being diffused by the diffuse plate 144 and guides it to the luminescent light emitting device 90. Since the luminescent light emitting device 90 emits light in the green wavelength range towards the first dichroic mirror 145 when excitation light is incident on the luminescent light emitting device 90. Consequently, the first dichroic mirror 145 can cause an axis of light in the blue wavelength range and an axis of light in the green wavelength range to coincide with each other.

The collective lens 146 collects the light in the blue wavelength range and the light in the green wavelength range which are guided by the first dichroic mirror 145 and guides them to the second dichroic mirror 147. The second dichroic mirror 147 reflects light in the blue wavelength range and light in the green wavelength range and transmits light in the red wavelength range. As a result, the second dichroic mirror 147 reflects the light in the blue wavelength range and the light in the green wavelength range which are collected by the collective lens 146 to thereby cause them to be incident on the collective lens 173 of the light source-side optical system 170. In addition, the second dichroic mirror 147 causes light in the red wavelength range emitted from the red light emitting diode 121 and collected by the collective lens 148 to be incident on the collective lens 173. As a result, the second dichroic mirror 147 can cause an axis of the light in the blue wavelength range, an axis of the light in the green wavelength range, and an axis of the light in the red wavelength range to coincide with one another.

The light source-side optical system 170 includes the collective lens 173, alight tunnel 175, a collective lens 178, a light axis changing mirror 181, a collective lens 183, a shining mirror 185, and a condenser lens 195. Since the condenser lens 195 emits image light emitted from a display device 51 disposed at a back panel 13 side of the condenser lens 195 towards the projection optical system 220, the condenser lens 195 also makes up a part of the projection optical system 220.

The collective lens 173, which is disposed near the light tunnel 75, collects light source light to an incident port of the light tunnel 175. The light in the blue wavelength range, the light in the green wavelength range, and the light in the red wavelength range, which have passed through the second dichroic mirror 147, are collected by the collective lens 173 and are then incident on the light tunnel 175. A pencil of light, which is incident on the light tunnel 175, is formed into a pencil of light whose intensity is distributed more uniformly by the light tunnel 175.

The collective lens 178 and the light axis changing mirror 181 are disposed on an optical axis of the light tunnel 175 on an emerging, back panel 13 side of the light tunnel 175. The pencil of light, whose intensity is now uniformly distributed, emerges from an emerging port of the light tunnel 175 and is then collected by the collective lens 178. Thereafter, an axis of the pencil of light is changed towards a left side panel 15 by the light axis changing mirror 181.

The pencil of light reflected by the light axis changing mirror 181 is collected by the collective lens 183 and is then shone onto the display device 51 at a predetermined angle by way of the condenser lens 195 by the shining mirror 185. In the present embodiment, the display device 51 is a digital micromirror device (DMD) including multiple micromirror lenses. A heat sink 190 is provided on a back panel 13 side of the display device 51, whereby the display device 51 is cooled by this heat sink 190.

The combined light shone onto an image forming plane of the display device 51 by the light source-side optical system 170 is reflected by the image forming plane of the display device 51 and is then projected on to a screen by way of the projection optical system 220 as image light. Here, the projection optical system 220 includes the condenser lens 195, and the movable lens group 235 and a fixed lens group 225, which are provided in a lens barrel. The lens barrel is made into a variable-focus lens and is configured so as to enable zooming and focusing. The movable lens group 235 can be adjusted manually or automatically using a lens motor 45.

With the projector 10 configured as described heretofore, and light is emitted from the luminescent light emitting device 90, the excitation light shining device 70 and the red light source device 120 at appropriate timings, light in the green wavelength range, light in the blue wavelength range, and light in the red wavelength range are incident on the collective lens 173 by way of the light guiding optical system 140 and is then shone on to the display device 51 by way of the light source-side optical system 170. As a result, a color image can be projected on to the screen as a result of the display device 51 displaying lights in the blue, green, and red wavelength ranges in a time-sharing fashion according to data.

In the present embodiment, the luminescent light emitting device 91 is described as having the heat dissipating ribs 912*a* having the substantially isosceles triangle-like shape in cross section; however, the heat dissipating ribs 912*a* may have other arbitrary shapes. For example, the heat dissipating ribs 912*a* may be formed into a flat plate-like shape so as to extend along the axial direction of the cylindrical casing 912. Alternatively, the heat dissipating ribs 912*a* may be formed into multiple flanges which are provided circumferentially on the outer circumferential surface of the cylindrical casing 912.

In the present invention, the collective lens 913 is fixed in place in the cylindrical casing 912 as the member for sealing in the luminescent body disposed in the interior of the cylindrical casing 912; however, another light transmitting member which is made up of a member having light transmitting properties may be used to seal in the luminescent body in place of the collective lens 913. For example, a cover configured to transmit light incident thereon as it is, a diffuse plate configured to expand a diffuse angle of light incident thereon, a wavelength plate configured to change a polarizing direction, and a color filter on which a dichroic layer is formed can be used as such a light transmitting member. In addition, these light transmitting members can be formed of glass, plastic, and the like. This light transmitting member also includes the collective lens 913 described in the present embodiment.

In the present embodiment, the projector 10 is described as using the digital light processing (DPL) method in which light in the blue wavelength range, light in the green wavelength range, and light in the red wavelength range are emitted from the light source unit 60 to be then shone on to the display device 51, which is DMD, and the display device 51 reflects the lights in the blue, green and red wavelength ranges to form an image frame; however, the projector 10 may be applied to a projector employing a 3 liquid crystal display (LCD) method as a configuration example of a projector employing the luminescent light emitting device 90. With the projector employing the 3 LCD method, light in the blue wavelength range, light in the green wavelength range, and light in the red wavelength range are emitted from a light source such as the luminescent light emitting device 90 described in the present embodiment, a laser diode, a light emitting device, or the like, then, a gradient control using a liquid crystal panel is performed for an optical path of each of the lights in the blue, green, and red wavelength ranges, and thereafter, the lights in the blue, green, and red wavelength ranges are combined together so as to form an image frame.

Thus, as has been described heretofore, the luminescent light emitting device 90, the light source unit 60, and the projector 10 are described as including the base 911, the luminescent material layer 914 formed on the base 911, the cylindrical casing 912 provided to rise erect from the base 911 at the outer circumferential portion of the luminescent material layer 914 and having the heat dissipating ribs 912*a* formed on the outer circumferential surface thereof, and the collective lens 913 positioned on the optical path of the luminescent material layer 914 and fixed to the cylindrical casing 912 so as to seal in the luminescent material layer 914. As a result, the luminescent material layer 914 and the collective lens 913, which are both fixed in place, are attached together in an integrated fashion, whereby the attachment accuracy is enhanced to thereby improve the airtightness of the luminescent material layer 914. Luminescent light can be collected and guided with good efficiency by improving the positioning accuracy of the collective lens 913. In addition, for example, a problem can be prevented in that foreign matters intrude to damage the optical member by improving the airtightness of the luminescent material layer 914. Further, since the cylindrical casing 912 is made to include the heat dissipating ribs 912*a*, even though the luminescent material layer 914 is disposed in the airtight state, the heat dissipating capability can be ensured, whereby a reduction in luminous efficiency accompanied by a rise in temperature of the luminescent layer material 914 can be suppressed to a certain level. Consequently, the luminance of luminescent light can also be improved.

With the luminescent light emitting device 90 in which the multiple heat dissipating ribs 912*a* are provided on the outer circumferential surface of the cylindrical casing 912 in the circumferential direction while being formed in such a manner as to extend in the axial direction of the cylindrical casing 912, since the surface area of the whole of the outer circumferential surface of the cylindrical casing 912 is increased, the heat dissipating effect can be enhanced.

With the luminescent light emitting device 90 in which the inner circumferential surface of the cylindrical casing 912 is mirror finished, luminescent light emitted from the luminescent material layer 914 can be used efficiently as emitted light from the luminescent light emitting device 90.

With the luminescent light emitting device 90 in which the base 911 is formed of copper and is connected with the cylindrical casing 912 by the heat transmitting joining member, the cylindrical casing 912 is formed into the iron cylinder, and the cylindrical casing 912 and the collective lens 913 are fixed together through crimping, heat generated from the luminescent material layer 914 can easily be transmitted towards the cylindrical casing 912 on which the heat dissipating ribs 912*a* are formed while the luminescent light emitting device 90 is configured simply.

With the luminescent light emitting device 90 in which the collective lens 913 is disposed in the vicinity of the luminescent material layer 914 so as to directly collect luminescent light falling within the half-power angle θh in the luminescent light emitted from the circumferential edge S1 of the shining area S, the collective lens 913 is allowed to collect much of the luminescent light so emitted, thereby improving the light collection efficiency of the collective lens 913. In addition, since the collective lens 913 is allowed to be disposed in the vicinity of the luminescent material layer 914 by the cylindrical casing 912, the whole of the luminescent light emitting device 90 can be made small in size.

In addition, with the luminescent light emitting device 90 in which the collective lens 92 whose lens diameter is greater than that of the collective lens 913 is disposed apart from the collective lens 913 and the cylindrical casing 912, luminescent light emitted from the luminescent material layer 914 can be collected further.

With the luminescent light emitting device 90 in which the luminescent material layer 914 is either of the member in which the luminescent particles are dispersed in the binder of silicone resin or the binder of alumina and the sintered body in which the luminescent particles are sintered, various forms of configurations can be applied to the luminescent material layer 914.

While the embodiment of the present invention has been described heretofore, the embodiment is presented as an example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A luminescent material protection mechanism comprising:
   a base;
   a luminescent material layer provided on a surface of the base;
   a cylindrical casing provided on the outer circumferential side of the luminescent material layer in such a manner as to rise erect from the surface of the base; and
   a collective lens fixed to the cylindrical casing to seal in the luminescent material layer,
   wherein the cylindrical casing has a heat dissipation rib provided so as to protrude from an outer circumferential surface,
   wherein the luminescent material layer emits luminescent light excited by excitation light incident from a light source via the collective lens toward the collective lens,
   wherein the light source is not disposed between the luminescent material layer and the base, and
   wherein a length from the surface of the base to a distal end portion of the cylindrical casing is longer than a length from the surface of the base to an apex of an emerging surface of the collective lens.

2. The luminescent material protection mechanism according to claim 1, wherein
   the heat dissipating rib comprises a triangular shape in cross section.

3. The luminescent material protection mechanism according to claim 2,
   wherein an inner circumferential surface of the cylindrical casing is mirror finished, and
   wherein the luminescent material layer is positioned on a center axis of the cylindrical casing.

4. The luminescent material protection mechanism according to claim 3,
   wherein the base is formed of copper and is connected with the cylindrical casing by a heat transmitting joining member,
   wherein the cylindrical casing is formed into an iron cylinder, and
   wherein the cylindrical casing and the collective lens are fixed in place through crimping.

5. The luminescent material protection mechanism according to claim 4,
   wherein the collective lens is disposed in the vicinity of the luminescent material layer so as to collect directly luminescent light falling within a half-power angle in luminescent light emitted from a circumferential edge of a shining area of the excitation light shone on to the luminescent material layer by way of the collective lens.

6. The luminescent material protection mechanism according to claim 4, comprising further:
   a second collective lens provided apart from the collective lens and the cylindrical casing and having a lens diameter greater than that of the collective lens.

7. The luminescent material protection mechanism according to claim 3,
   wherein the collective lens is disposed in the vicinity of the luminescent material layer so as to collect directly luminescent light falling within a half-power angle in luminescent light emitted from a circumferential edge of a shining area of the excitation light shone on to the luminescent material layer by way of the collective lens.

8. The luminescent material protection mechanism according to claim 3, comprising further:
   a second collective lens provided apart from the collective lens and the cylindrical casing and having a lens diameter greater than that of the collective lens.

9. The luminescent material protection mechanism according to claim 3,
   wherein the luminescent material layer is either of a member in which luminescent particles are dispersed in a binder of silicone resin or a binder of alumina and a member in which luminescent particles are sintered.

10. The luminescent material protection mechanism according to claim 2,
    wherein the base is formed of copper and is connected with the cylindrical casing by a heat transmitting joining member,
    wherein the cylindrical casing is formed into an iron cylinder, and
    wherein the cylindrical casing and the collective lens are fixed in place through crimping.

11. The luminescent material protection mechanism according to claim 10,
    wherein the collective lens is disposed in the vicinity of the luminescent material layer so as to collect directly luminescent light falling within a half-power angle in luminescent light emitted from a circumferential edge of a shining area of the excitation light shone on to the luminescent material layer by way of the collective lens.

12. The luminescent material protection mechanism according to claim 10, comprising further:
    a second collective lens provided apart from the collective lens and the cylindrical casing and having a lens diameter greater than that of the collective lens.

13. The luminescent material protection mechanism according to claim 10,
    wherein the luminescent material layer is either of a member in which luminescent particles are dispersed in a binder of silicone resin or a binder of alumina and a member in which luminescent particles are sintered.

14. The luminescent material protection mechanism according to claim 2,
    wherein the collective lens is disposed in the vicinity of the luminescent material layer so as to collect directly luminescent light falling within a half-power angle in luminescent light emitted from a circumferential edge of a shining area of the excitation light shone on to the luminescent material layer by way of the collective lens.

15. The luminescent material protection mechanism according to claim 2, comprising further:
a second collective lens provided apart from the collective lens and the cylindrical casing and having a lens diameter greater than that of the collective lens.

16. The luminescent material protection mechanism according to claim 2,
wherein the luminescent material layer is either of a member in which luminescent particles are dispersed in a binder of silicone resin or a binder of alumina and a member in which luminescent particles are sintered.

17. The luminescent material protection mechanism according to claim 1,
wherein the collective lens is disposed in the vicinity of the luminescent material layer so as to collect directly luminescent light falling within a half-power angle in luminescent light emitted from a circumferential edge of a shining area of the excitation light shone on to the luminescent material layer by way of the collective lens.

18. The luminescent material protection mechanism according to claim 1,
wherein the luminescent material layer is either of a member in which luminescent particles are dispersed in a binder of silicone resin or a binder of alumina and a member in which luminescent particles are sintered.

19. The luminescent material protection mechanism according to claim 1,
wherein the collective lens is in contact with the cylindrical casing.

20. The luminescent material protection mechanism according to claim 1,
wherein the base is a metal plate.

21. A light source unit comprising:
an excitation light shining device for emitting excitation light; and
a luminescent material protection mechanism,
wherein the luminescent material protection mechanism comprises:
a base;
a luminescent material layer provided on a surface of the base;
a cylindrical casing provided on the outer circumferential side of the luminescent material layer in such a manner as to rise erect from the surface of the base; and
a collective lens fixed to the cylindrical casing to seal in the luminescent material layer,
wherein the cylindrical casing has a heat dissipation rib provided so as to protrude from an outer circumferential surface,
wherein the luminescent material layer emits luminescent light excited by the excitation light incident from the light source via the collective lens toward the collective lens,
wherein the light source is not disposed between the luminescent material layer and the base, and
wherein a length from the surface of the base to a distal end portion of the cylindrical casing is longer than a length from the surface of the base to an apex of an emerging surface of the collective lens.

22. A projector comprising:
the light source unit according to claim 21;
a display device on to which light source light emitted from the light source unit is shone to form image light;
a projection optical system for projecting the image light emitted from the display device on to a screen; and
a processor for controlling the display device and the light source unit.

23. The luminescent material protection mechanism according to claim 21,
wherein the collective lens is in contact with the cylindrical casing.

24. The luminescent material protection mechanism according to claim 21,
wherein the base is a metal plate.

* * * * *

UNITED STATES PATENT AND TRADEMARK OFFICE
CERTIFICATE OF CORRECTION

PATENT NO. : 11,635,673 B2
APPLICATION NO. : 17/160921
DATED : April 25, 2023
INVENTOR(S) : Masahiro Ogawa It is certified that error appears in the above-identified patent and that said Letters Patent is hereby corrected as shown below:

In the Specification

In Column 2, Line 64, delete "byway" and insert -- by way --, therefor.

In Column 3, Line 15, delete "byway" and insert -- by way --, therefor.

In Column 4, Line 28, delete "Apart" and insert -- A part --, therefor.

In Column 8, Line 24, delete "alight" and insert -- a light --, therefor.

In the Claims

In Column 11, Claim 1, Line 40, delete "toward" and insert -- towards --, therefor.

In Column 14, Claim 21, Line 16, delete "toward" and insert -- towards --, therefor.

Signed and Sealed this
Twelfth Day of September, 2023

Katherine Kelly Vidal
*Director of the United States Patent and Trademark Office*